Sept. 10, 1963  E. M. LAU  3,103,300
SLEEVE VALVE
Filed Dec. 30, 1960  2 Sheets-Sheet 1
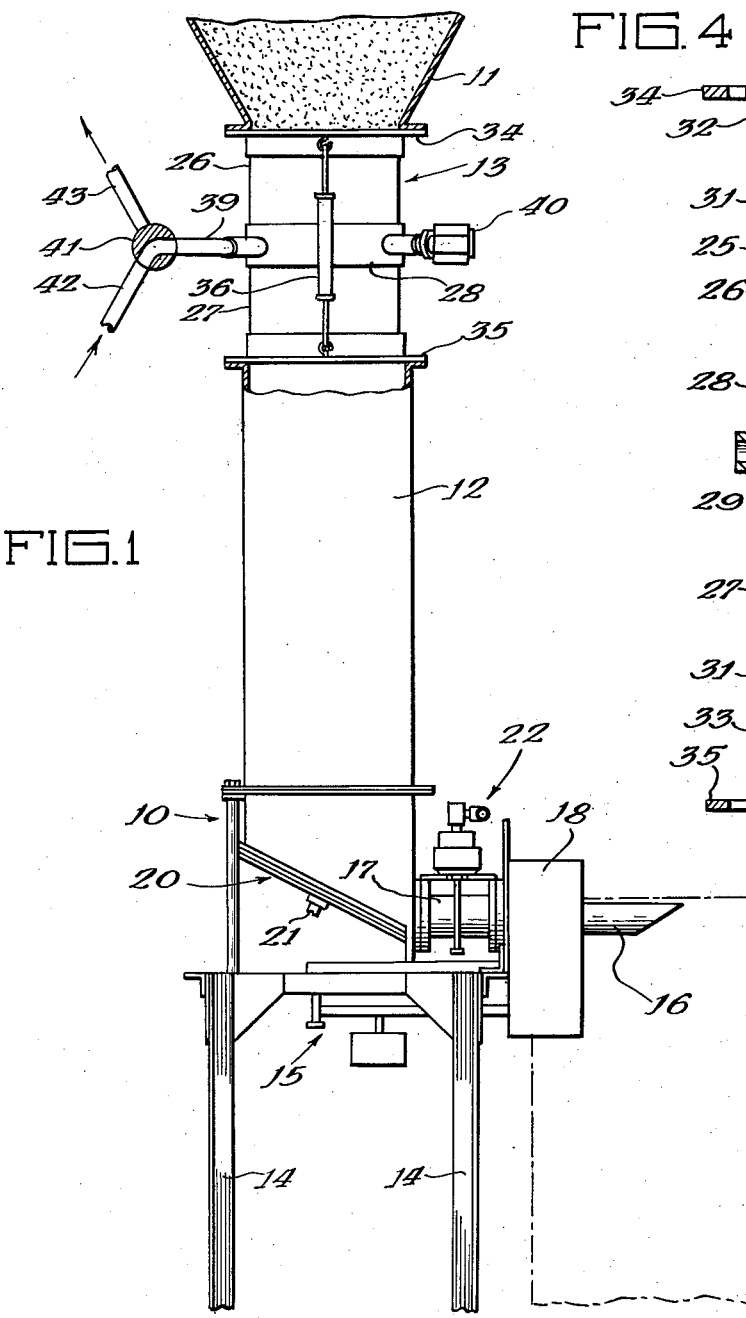
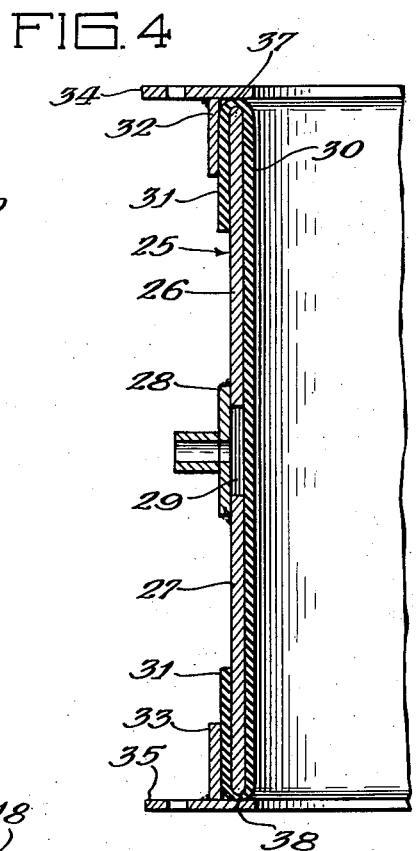
Inventor:
Erwin M. Lau
By: Zabel, Baker, York,
Jones & Dithmar
Attorneys

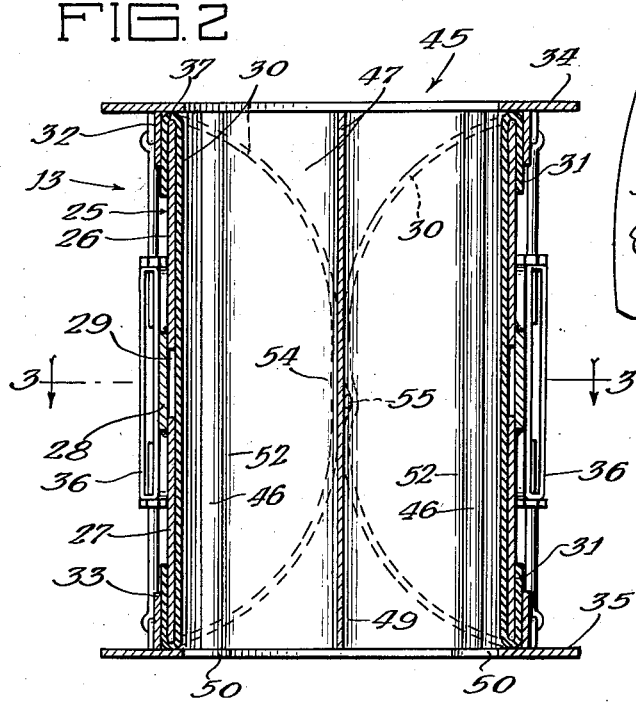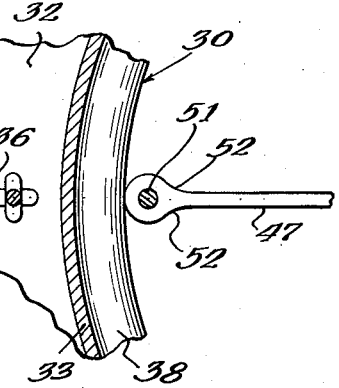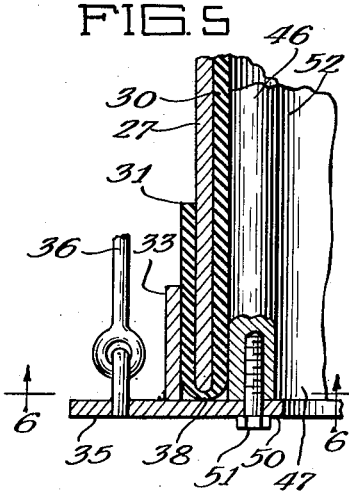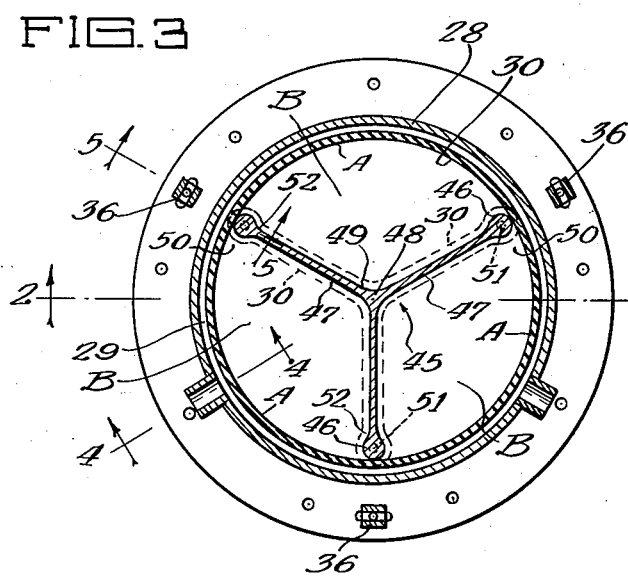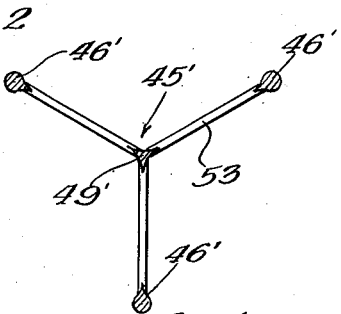

United States Patent Office 3,103,300
Patented Sept. 10, 1963

3,103,300
SLEEVE VALVE
Erwin M. Lau, Dolton, Ill., assignor to Black Products Co., Chicago, Ill., a corporation of Illinois
Filed Dec. 30, 1960, Ser. No. 79,796
4 Claims. (Cl. 222—195)

This invention relates to a rubber sleeve valve which is particularly well adapted for cutting off the flow of solid materials therethrough, such as granular, powdered, or flaky materials.

The invention is illustrated in connection with its application to a bag filling machine of the fluidizing type such as shown in my Patent No. 2,936,994, dated May 17, 1960.

In this type of application, the requirements of the feed valve are that it not only cut off the flow of solid materials, but also provide an air tight seal so that the pressure within the conditioning chamber can be maintained during the filling operation.

As contrasted with the pinch type of feed valve shown in my earlier patent, the present valve is better adapted for use with granular materials, since a grain of corn, for instance, which might be entrapped at the pinching point of a pinch valve, would prevent complete closing of the valve and consequent loss of pressure within the conditioning chamber.

According to the present invention, the material of the sleeve will surround entrapped solid particles and form a gas-tight seal irrespective of the presence of the solid particles.

It is an object of the present invention to provide an improved valve for cutting off the flow of solid materials and which at the same time will provide a gas-tight seal which is not affected by the presence of entrapped solid particles.

Another object is to provide an improved sleeve valve which can be operated at comparatively low pressures without encountering the leakage which is usually associated with low pressure operation of a sleeve valve.

According to my invention, I provide a sleeve valve having a core in the form of a plurality of peripheral core elements which are engaged by the sleeve during extension thereof and which control the shape of the sleeve in its extended position in such a manner that the material of the sleeve is subjected to tensile stress during extension thereof, thereby avoiding the formation of such creases, wrinkles or folds as would be a source of gas leakage. In other words, whereas the usual sleeve valve could be said to operate by a contraction of the sleeve, according to my invention the sleeve valve operates by an expansion of the material of the sleeve.

Still another object of my invention is to provide an improved valve construction in which the ratio of sleeve length to sleeve diameter may be minimized. This is particularly important in connection with the use of a feed valve for a bag filling machine because the head room is frequently limited with the result that the saving of a few inches may be quite important in certain installations. In the device shown, the ratio of length to diameter is as low as 17 to 10.

A further object of my invention is to provide a rubber sleeve valve of inexpensive construction which can be fabricated from ordinary rubber tubing, as contrasted with specially molded rubber parts.

A further object is to provide a feed valve for a bag filling machine whereof the rubber sleeve is of longer life than that of the ordinary pinch valve.

Still another object is to provide an improved type of core arrangement for a rubber sleeve valve.

Other objects, features, and advantages will become apparent as the description proceeds.

With reference now to the drawings in which like reference numerals designate like parts:

FIG. 1 is a side elevation of a bag filling machine embodying my improved sleeve valve;

FIG. 2 is an enlarged sectional elevation of the valve with the changed position of the sleeve shown in broken lines;

FIG. 3 is a plan section thereof taken along line 3—3 of FIG. 2 with the changed position of the sleeve shown in broken lines;

FIG. 4 is a fragmentary vertical section taken along line 4 of FIG. 3;

FIG. 5 is a fragmentary vertical section taken along line 5 of FIG. 3;

FIG. 6 is a bottom view taken along line 6—6 of FIG. 5; and

FIG. 7 shows a modified core structure.

In FIG. 1, the reference numeral 10 designates generally a bag filling machine which is disposed beneath a hopper 11. The bag filling machine 10 includes a conditioning chamber 12 located beneath the outlet of the hopper 11, and communicating therewith by means of a flow valve 13 which, according to my invention, is in the form of a sleeve valve.

The bag filling machine 10 also includes a supporting framework 14, and scale mechanism generally indicated by the reference numeral 15. A spout 16 communicates with the lower end of the conditioning chamber 12 by a flexible rubber tube 17, and suitable spout supporting mechanism 18 is provided which also provides a connection with the scale mechanism 15.

A diffuser pad 20 is located at the bottom of the conditioning chamber 12 and has a suitable connection to an air conduit 21. A bag 19 may be supported from the spout 16.

When air is caused to flow through the conduit 21 and the diffuser pad 20, the material within the conditioning chamber 12 is fluidized and will flow in a horizontal direction through the spout 16 into the bag 19. When the weight of the bag and contents reaches a predetermined amount, the scale mechanism 15 is tripped and the flow of air to the diffuser pad 20 is automatically cut off, thus stopping the flow of material. In order to provide accuracy of operation, additional valve means, such as a pinch valve 22, which engages the tube 17, is provided to cut off the flow of material through the tube 17 and to the spout 16.

Material is permitted to flow from the hopper 11 into the conditioning chamber 12 by operation of the sleeve valve 13, which is automatically opened at the conclusion of each filling operation for an interval sufficient to permit the required charge of material to drop from the hopper 11 into the conditioning chamber, and the actuation thereof may be effected either by timing mechanism, or by a level responsive device, or by the initiation of another bag filling cycle.

As shown in FIGS. 2 and 4, the sleeve valve comprises a cylindrical casing 25 which is made up of an upper cylinder part 26, a lower cylinder part 27, and a connecting ring 28. The parts 26 and 27 are axially spaced from each other, and the connecting ring 28 overlaps the lower end of the upper part 26 and the upper end of the lower part 27. Thus, an annular chamber 29 is provided.

The valve member is in the form of a rubber sleeve 30 which is disposed interiorly of the casing 25, and which is of a length greater than the height of the casing 25 so as to provide end portions 31 which are folded over the ends of the casing 25 in the manner shown.

A top annular plate 32 overlies the upper fold 37 of the sleeve 30, and a bottom annular plate 33 underlies the bottom fold 38 of the sleeve. These plates have flanges 34 and 35 respectively which encircle the two end portions 31 of the sleeve 30. Suitable turnbuckles 36 are provided to draw the plates 32 and 33 toward each other and into engagement with the two folds 37 and 38 of the sleeve. Thus, a gas tight seal is provided between the ends of the casing 25 and the sleeve, and in this connection, the end edges of the casing 25 may be rounded and polished to provide a smooth surface which will not cut into the rubber of the sleeve.

Compressed air is introduced into the annular chamber by means of an inlet nipple 39 mounted on the connecting ring 28, as shown in FIG. 4. A safety valve 40 also communicates with the annular chamber 29. Thus, the sleeve may be extended into its operative position as shown in FIG. 2 by causing compressed air to flow through the inlet tube 39, and in this connection there is provided a suitable control valve such as a two-way valve 41 (FIG. 1) which may be automatically actuated as pointed out above.

I have found that when the sleeve 30 is extended, that wrinkles and creases will be formed therein, due to the contraction of the diameter. When the sleeve is formed of sheet rubber of substantial thickness, any fold is a source of gas leakage. Of course, it may be theoretically possible to provide a pressure which is sufficiently high as to overcome the stiffness of the rubber at the folded points, but in such situations, it has been found that the sleeve will blow out at the ends. Therefore, in order that a gas tight seal may be provided which may be operated by only moderate pressures, such as 3 to 6 pounds per square inch, I have provided a core 45 which is so constructed and arranged as to prevent wrinkles and creases of the sleeve.

As shown in FIG. 3, the core 45 comprises a plurality of core elements which are disposed parallel to the axis of the casing 25. Three or more of these core elements are peripheral core elements 46 which are located close to the casing 25 so as to engage the rubber sleeve 30 as it is being extended. The other core element is a central core element 48. In the preferred form of the invention shown in FIG. 3, the peripheral elements 46 are connected to the central element 48 by means of radially disposed webs 47, and fillets 49 are provided at the common meeting point of the webs 47. Thus, the core 45 is in the form of a spider comprising a plurality of webs 47, the rounded edges 46 of which comprise the peripheral core elements, and the meeting point 48 of which provides the central core element.

The core 45 is supported by means of lugs 50 formed at the bottom plate 33 at points underlying the peripheral elements 46, and suitable screws 51 are provided to secure the core in place, as shown in FIGS. 5 and 6.

The core 45 divides the sleeve 30 into three or more segments A so that each one will act as a single valve. Thus, the extensibility of the rubber sleeve is controlled in such a manner that all wrinkles and creases will be eliminated. In other words, each sleeve segment is independent of the others with respect to flexure, and the action is more of an expansion of three separate segments, rather than one of contraction of a cylinder. As a result, the shape of the extended segment will be free of reentrant portions, as shown by the broken lines in FIG. 3.

The vertical core elements 46 may either be located so that they engage the rubber sleeve 30 even when it is in its relaxed position, as shown in FIG. 3, or they can be spaced slightly inwardly from their position shown in FIG. 3. The inwardly spaced position is preferred where there is no annular chamber 29, as where the casing 25 is made in one piece.

The rounded web edges, provided by the peripheral core elements 46 are of sufficient diameter as to insure that the rubber sleeve will engage it at all points, and in this connection, filleting is provided at points 52 as shown in FIG. 6.

Similarly, the fillets 49 at the central core element 48 are of sufficient radius as to permit close contact between the sleeve 30 and the core 45. Thus, at the points of maximum bending or flexure, the radius is controlled so as to avoid all possibility of leakage.

According to the arrangement shown in FIG. 3, the webs 47 of the core divide the internal diameter into three separate passageways B, each of which is bounded on one side by an extensible segment A, thus providing in effect three separate valves. However, if desired, the webs 47 may be eliminated as shown in FIG. 7 so that the core comprises only the peripheral elements 46' and the central core element 48' plus a supporting spider 53 connecting the several elements at one or more points.

The core element 48' is of triangular shape with concave sides so as to function the same as the fillets 49. Under certain conditions of sleeve flexibility and air pressure, the central core element 48' may not be necessary.

To summarize the operation which has been previously pointed out in connection with the description of the several parts and sub-assemblies, the control valve 41 is normally in its FIG. 1 position in which the sleeve is extended to cut off the feed from the hopper 11 into the conditioning chamber 12.

Between bag filling operations, the position of the control valve 41 is reversed for a short period of time to cut off the air supply from the supply line 42 and in order to vent the chamber 29 to the atmosphere, thus causing the feed valve 13 to open. At the conclusion of the feeding period which may be determined by suitable control means, not shown, the control valve 41 is again opened to cause air or other fluid to be supplied to chamber 29 so as to cause extension of the segments A into the passageways B.

The valve closing action is progressive in that contact is first made at a midpoint 54 and subsequently the area of contact increases. In the meantime, however, any particles of solid which have already passed the midpoint will continue their falling movement at a rate which is greater than the rate of increase in the contact area. As a result, that portion of the sleeve 30 which is located beneath the midpoint 54 will be relatively free of entrapped particles, and hence a gas-tight seal will be provided even though the particles will collect at points above the midpoint 54, as is illustrated in the right hand half of FIG. 2. To the extent that one or more particles are engaged by the sleeve immediately below the midpoint, the sleeve will seal off the entrapped particles as indicated at 55.

My improved sleeve valve is also applicable for use in connection with fluids, and also for use to cut off the flow of solid materials even where a gas-tight seal is not required. For example, the sleeve valve could be substituted for the pinch valve 22 of FIG. 1.

Furthermore, the construction herein shown can be applied to advantage in connection with any sleeve valve since it permits the use of any suitable rubber tubular stock due to the nature of the seal provided at the folds 37 and 38. The thickness of the rubber stock does not detract from the operability due to the provision of my improved core. Thus, it is possible to manufacture a sleeve valve according to my invention without resorting to the use of specially molded rubber parts.

Although only preferred embodiments of my invention have been shown and described herein it will be understood that various modifications and changes may be made in the construction shown without departing from the spirit of my invention as pointed out in the appended claims.

I claim:

1. Apparatus for filling bags with granular or powdered materials contained in a hopper comprising a bag filling machine adapted for location beneath the outlet of said hopper, and which includes an upright conditioning chamber having an inlet at the top wall thereof, a filling spout disposed at the lower end of said conditioning chamber for filling the bag, a diffuser pad located at the bottom of said conditioning chamber for fluidizing the material in said conditioning chamber to cause the same to flow through said spout, an air line connected to said diffuser pad for supplying fluidizing air thereto, and a sleeve valve disposed above said conditioning chamber between said inlet and said hopper, and providing a valve passage having a cross sectional area which is large with respect to the cross sectional area of said conditioning chamber so as to permit the freely falling flow of said granular or powdered materials from said hopper and through said passageway and into said conditioning chamber, said sleeve valve comprising a substantially cylindrical casing having a diameter more than half the length of said valve passage, a rubber sleeve disposed interiorly of said casing and secured at its ends to said casing in gas-tight relationship, means for introducing a fluid into the space between said sleeve and said casing, and a core disposed within said sleeve and comprising a spider having a plurality of radially disposed webs, the edges of said webs extending for substantially the full length of said casing and engaging the sleeve when it is in its relaxed position and dividing said valve passage interiorly of said sleeve into a plurality of passageways, said sleeve being divided by the edges of said webs into a plurality of sleeve segments which are separately extensible so as to provide a separate closing means for each of said passageways, said webs providing a backing against which particles of said freely falling granular or powdered materials may be resiliently engaged by said sleeve segments and entrapped to provide a seal which prevents upward flow of fluidizing air through said passageways.

2. Apparatus for filling bags as claimed in claim 1 in which said rubber sleeve is longer than said casing, the ends of said sleeve being folded back and overlapping the end portions of said casing, annular end plates engaging said casing, and means extending between said end plates for drawing said end plates toward each other to provide a gas-tight seal between said casing and said sleeve.

3. A sleeve valve comprising a substantially cylindrical casing, a rubber sleeve disposed interiorly of said casing and of a length greater than the length of said casing, the ends of said sleeve being folded back and overlapping the end portions of said casing, annular end plates engaging said sleeve at the points where it is folded back over the end portions of said casing, means drawing said end plates toward each other to provide a gas-tight seal between said casing ends and said sleeve, said cylindrical casing comprising an upper cylinder part, a lower cylinder part, and a connecting ring, said upper and lower cylinder parts being axially spaced from each other, and said connecting ring overlapping and being sealed to the lower end of said upper part and the upper end of said lower part so as to provide an annual chamber surrounding the middle portion of said rubber sleeve, inlet means for introducing a fluid into said annular chamber and between said sleeve and said casing to extend said sleeve, and a core structure mounted interiorly of said rubber sleeve and having a plurality of peripheral core elements arranged parallel to the axis of said casing and disposed in proximity to said rubber sleeve when in its relaxed position.

4. Apparatus for filling bags as claimed in claim 2 in which said means drawing said end plates toward each other comprise turnbuckle means.

References Cited in the file of this patent

UNITED STATES PATENTS

| 2,766,765 | Bolanowski et al. | Oct. 16, 1956 |
| 2,936,994 | Lau | May 17, 1960 |

FOREIGN PATENTS

| 508,973 | Italy | Jan. 12, 1955 |
| 1,226,645 | France | July 13, 1960 |